United States Patent
Papasakellariou et al.

(10) Patent No.: US 11,523,391 B2
(45) Date of Patent: *Dec. 6, 2022

(54) PARTITIONING OF FREQUENCY RESOURCES FOR TRANSMISSION OF CONTROL SIGNALS AND DATA SIGNALS IN SC-FDMA COMMUNICATION SYSTEMS

(71) Applicant: Samsung Electronics Co., Ltd., Gyeonggi-do (KR)

(72) Inventors: Aris Papasakellariou, Dallas, TX (US); Joon-Young Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 81 days.

This patent is subject to a terminal disclaimer.

(21) Appl. No.: 16/907,880

(22) Filed: Jun. 22, 2020

(65) Prior Publication Data

US 2020/0322955 A1    Oct. 8, 2020

Related U.S. Application Data

(60) Continuation of application No. 16/545,530, filed on Aug. 20, 2019, now Pat. No. 10,694,522, which is a
(Continued)

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0007* (2013.01); *H04L 5/0053* (2013.01);
(Continued)

(58) Field of Classification Search
CPC ..... H04B 7/2123; H04B 7/212; H04W 72/04; H04W 88/08; H04W 76/00;
(Continued)

(56) References Cited

U.S. PATENT DOCUMENTS 6,980,540 B1    12/2005    Larola et al.
7,079,848 B2    7/2006    Das et al.
(Continued)

FOREIGN PATENT DOCUMENTS

CN    1805318    7/2006
EP    1 351 539    10/2003
(Continued)

OTHER PUBLICATIONS

Motorola, "Uplink Control Signaling Considerations for E-UTRA", R1-061468, 3GPP TSG RAN1#45, May 12, 2006.
(Continued)

*Primary Examiner* — Brenda H Pham

(74) *Attorney, Agent, or Firm* — The Farrell Law Firm, P.C.

(57) ABSTRACT

Methods and apparatuses are provided for determining a resource for an acknowledgement signal in a wireless communication system. A transceiver of a user equipment (UE) receives a parameter associated with one or more resource blocks (RBs) for periodic transmission of a channel quality indication (CQI) signal in an operating bandwidth. A controller of the UE determines an RB for transmission of the acknowledgement signal, based on the parameter. The transceiver transmits the acknowledgement signal on the determined RB. The RB for the transmission of the acknowledgement signal is not more outer than the one or more RBs for periodic transmission of the CQI signal in the operating bandwidth.

16 Claims, 10 Drawing Sheets

Related U.S. Application Data division of application No. 16/057,096, filed on Aug. 7, 2018, now Pat. No. 10,412,737, which is a continuation of application No. 15/483,606, filed on Apr. 10, 2017, now Pat. No. 10,045,348, which is a continuation of application No. 14/866,024, filed on Sep. 25, 2015, now Pat. No. 9,622,244, which is a continuation of application No. 14/010,006, filed on Aug. 26, 2013, now Pat. No. 9,491,760, which is a continuation of application No. 13/228,003, filed on Sep. 8, 2011, now Pat. No. 8,520,656, which is a continuation of application No. 12/136,461, filed on Jun. 10, 2008, now Pat. No. 8,031,688.

(60) Provisional application No. 60/976,959, filed on Oct. 2, 2007, provisional application No. 60/934,066, filed on Jun. 11, 2007.

(51) Int. Cl.
*H04W 16/02* (2009.01)
*H04W 88/02* (2009.01)
*H04W 88/08* (2009.01)

(52) U.S. Cl.
CPC .......... *H04L 5/0055* (2013.01); *H04L 5/0057* (2013.01); *H04L 5/0064* (2013.01); *H04L 5/0082* (2013.01); *H04L 5/0091* (2013.01); *H04W 16/02* (2013.01); *H04W 72/0413* (2013.01); *H04W 88/02* (2013.01); *H04W 88/08* (2013.01)

(58) Field of Classification Search
CPC ......... H04W 72/0446; H04W 72/0453; H04W 84/08; H04W 76/02; H04W 84/12; H04W 74/0816
USPC .......................... 370/322, 329, 330, 341, 348
See application file for complete search history.

(56) References Cited

U.S. PATENT DOCUMENTS

| | | | |
|---|---|---|---|
| 7,551,546 B2 | 6/2009 | Ma | |
| 8,031,688 B2 * | 10/2011 | Papasakellariou | .... H04L 5/0064 370/344 |
| 8,116,277 B2 | 2/2012 | Lee | |
| 8,520,656 B2 * | 8/2013 | Papasakellariou | .... H04L 5/0007 370/344 |
| 9,622,244 B2 | 4/2017 | Papasakellariou | |
| 2002/0141367 A1 * | 10/2002 | Hwang | ................. H04L 1/1671 370/335 |
| 2004/0105402 A1 | 6/2004 | Yi et al. | |
| 2005/0128993 A1 | 6/2005 | Yu et al. | |
| 2007/0097981 A1 | 5/2007 | Papasakellariou | |
| 2007/0140166 A1 | 6/2007 | Eichinger et al. | |
| 2007/0153684 A1 | 7/2007 | Choi | |
| 2007/0153834 A1 | 7/2007 | Qu et al. | |
| 2007/0171809 A1 | 7/2007 | Pajukoski et al. | |
| 2007/0189197 A1 | 8/2007 | Kwon et al. | |
| 2007/0218904 A1 | 9/2007 | Park et al. | |
| 2007/0223440 A1 | 9/2007 | Ho et al. | |
| 2007/0259672 A1 | 11/2007 | Heo et al. | |
| 2008/0101211 A1 | 5/2008 | Rao | |
| 2009/0047912 A1 * | 2/2009 | Lee | ....................... H04L 1/1671 455/69 |
| 2009/0316811 A1 | 12/2009 | Maeda | |
| 2010/0027409 A1 | 2/2010 | Kwon et al. | |

FOREIGN PATENT DOCUMENTS

| | | |
|---|---|---|
| JP | 2002-125271 | 4/2002 |
| JP | 2003-319467 | 11/2003 |
| JP | 2005-160079 | 6/2005 |
| RU | 93-0343320 | 2/1996 |
| RU | 2004-126152 | 2/2006 |
| WO | WO 2004/017540 | 2/2004 |
| WO | WO 2005/074312 | 8/2005 |
| WO | WO 2008/014275 | 1/2008 |
| WO | WO 2008/048055 | 4/2008 |
| WO | WO 2008/137963 | 11/2008 |

OTHER PUBLICATIONS

Siemens, "Considerations on Enhanced Uplink Scheduling Options", 3GPP TSG RAN WG1 #38, R1-040965, Aug. 20, 2004.
Qualcomm Europe, "Mapping of UL ACK Transmission based on DL VRB", 3GPP TSG RAN1 #48, R1-070660, May 12, 2006.
Samsung, "ACK/NAK Repetitions in E-UTRA UL", R1-074098, 3GPP TSG RAN WG1 #50bis, Oct. 2, 2007.
NEC Group, "Reference Signal Multiplexing for data-non-associated Control Signal in EUTRA Uplink", R1-062768, 3GPP TSG RAN WG1 Meeting #46bis, Oct. 4, 2006.
Texas Instruments, "ACK/NAK and CQI Multiplexing Capacity and Performance in E-UTRA UL", 7.13.2, May 7-11, 2007.
Qualcomm Europe, "Sounding Reference Signals", 7.11.2, May 7-11, 2007.
Qualcomm Europe, "RS Structure for UL ACK Transmission", 7.11.2, May 7-11, 2007.
NTT DoCoMo, KDDI, Mitsubishi Electric, NEC, Pansonic, Sharp, "Repetition of ACK/NACK in E-UTRA Uplink", 6.9.1, Jan. 15-19, 2007.
NTT DoCoMo, Sharp, Toshiba Corporation, "Data-Non-Associated L1/L2 Control Channel Structure for E-UTRA Uplink", 6.3.3, Jun. 27-30, 2006.
Panasonic, "Mapping Position of Control Channel for Uplink SC-FDMA", 8.1, Nov. 7-11, 2005.
Motorola, "E-UTRA Uplink L1/L2 Control Channel Mapping", R1-063075, 3GPP TSG RAN1 #47, Nov. 6-10, 2006.
Japanese Office Action dated Jan. 13, 2015 issued in counterpart application No. 2014-094490.
Korean Office Action dated Jan. 29, 2015 issued in counterpart application No. 10-2014-7031649.
Qualcomm Europe, "Mapping of UL ACK Transmission based on DL VRB", R1-070660, 3GPP TSG RAN1 #48, Feb. 6, 2007.
Samsung, "Uplink ACK/NACK Resource Allocation", R1-071574, 3GPP TSG RAN WG1 Meeting #48bis, Apr. 3, 2007.
NTT DoCoMo, Fujitsu, NEC, Toshiba Corporation, "ACK/NACK Signal Structure in E-UTRA Downlink", R1-070867, 3GPP TSG RAN WG1 Meeting #48, Feb. 6, 2007.
Qualcomm Europe, "Support of ACK Repetition for E-UTRA Uplink", R1-073261, 3GPP TSG RAN1#50, Aug. 15, 2007.
NEC Group, "Downlink ACK/NACK Signalling for E-UTRA", R1-072120, TSG-RAN WG1#49, May 2, 2007.
Korean Office Action dated Nov. 24, 2015 issued in counterpart application No. 10-2014-7031649, 7 pages.
Nokia Siemens Networks, Nokia, "Multiplexing of ACK/NACK and CQI from the same UE", R1-072311, 3GPP TSG RAN WG1 Meeting #49, May 7-11, 2007, 5 pages.
NTT DoCoMo et al., "CDM-based Multiplexing Method of Multiple ACK/NACK and CQI for E-UTRA Uplink", R1-062742, 3GPP TSG RAN WG1 Meeting #46bis, Oct. 9-13, 2006, 6 pages.
Chinese Office Action dated Aug. 5, 2015 issued in counterpart application No. 201310189014.8, 12 pages.
Samsung, "Implicit Resource Allocation for Uplink ACK/NACK Signaling", R1-072227, 3GPP TSG RAN WG1 Meeting #49, May 7-11, 2007, 2 pages.
Samsung, "ACK/NAK Repetitions in E-UTRA UL", R1-080677, 3GPP TSG RAN WG1 #52, Feb. 11-15, 2008, 4 pages.
Samsung, "UL ACK/NACK Channel Structure", R1-073541, 3GPP TSG RAN WG1 Meeting #50, Aug. 20-24, 2007, 5 pages.
NTT DoCoMo et al., "Implicit Resource Allocation of ACK/NACK Signal in E-UTRA Uplink", R1-071650, 3GPP TSG RAN WG1 Meeting #48bis, Mar. 26-30, 2007, 3 pages.
European Search Report dated May 8, 2017 issued in counterpart application No. 17153949.7-1874, 11 pages.

(56) References Cited

OTHER PUBLICATIONS

European Search Report dated May 21, 2019 issued in counterpart application No. 17153949.7-1220, 7 pages.

* cited by examiner

PARTITIONING OF FREQUENCY RESOURCES FOR TRANSMISSION OF CONTROL SIGNALS AND DATA SIGNALS IN SC-FDMA COMMUNICATION SYSTEMS

PRIORITY

This application is a continuation application of U.S. patent application Ser. No. 16/545,530, filed in the U.S. Patent and Trademark Office (USPTO) on Aug. 20, 2019, which is a divisional application of U.S. patent application Ser. No. 16/057,096, filed in the USPTO on Aug. 7, 2018, now U.S. Pat. No. 10,412,737, issued on Sep. 10, 2019, which is a continuation application of U.S. patent application Ser. No. 15/483,606, filed in the USPTO on Apr. 10, 2017, now U.S. Pat. No. 10,045,348, issued on Aug. 7, 2018, which is a continuation application of U.S. patent application Ser. No. 14/866,024, filed in the USPTO on Sep. 25, 2015, now U.S. Pat. No. 9,622,244, issued on Apr. 11, 2017, which is a continuation application of U.S. patent application Ser. No. 14/010,006, filed in the USPTO on Aug. 26, 2013, now U.S. Pat. No. 9,491,760, issued on Nov. 8, 2016, which is a continuation application of U.S. patent application Ser. No. 13/228,003, filed in the USPTO on Sep. 8, 2011, now U.S. Pat. No. 8,520,656, issued on Aug. 27, 2013, which is a continuation application of U.S. patent application Ser. No. 12/136,461, filed in the USPTO on Jun. 10, 2008, now U.S. Pat. No. 8,031,688, issued on Oct. 4, 2011, which claims priority under 35 U.S.C. 119(f) to U.S. Provisional Patent Application No. 60/934,066, filed in the USPTO on Jun. 11, 2007, and to U.S. Provisional Patent Application No. 60/976,959, filed in the USPTO on Oct. 2, 2007, the contents of all of which are incorporated herein by reference.

BACKGROUND OF THE INVENTION

1. Field of the Invention

The present invention is directed, in general, to wireless communication systems and, more specifically, to a Single-Carrier Frequency Division Multiple Access (SC-FDMA) communication system and is further considered in the development of the $3^{rd}$ Generation Partnership Project (3GPP) Evolved Universal Terrestrial Radio Access (E-UTRA) long term evolution (LTE).

2. Description of the Art

In particular, the present invention considers partitioning resources allocated to the transmissions of control signals and data signals in a SC-FDMA communication system. The invention assumes the UpLink (UL) communication corresponding to signal transmissions from mobile User Equipments (UEs) to a serving base station (or Node B). A UE, also commonly referred to as terminal or mobile station, may be fixed or mobile and may be a wireless device, a cellular phone, a personal computer device, a wireless modem card, etc. A Node B is generally a fixed station and may also be called a Base Transceiver System (BTS), an access point, or some other terminology.

Several types of signals need to be supported for the proper functionality of the communication system. In addition to data signals, which convey the information content of the communication, control signals also need to be transmitted from the UEs to their serving Node B in the UL and from the serving Node B to the UEs in the DownLink (DL) in order to enable the proper transmission of data signals. The DL refers to the communication from the Node B to UEs. These control signals are subsequently described in detail with the focus being on the UL.

The UEs are assumed to transmit data signals (or data packets) through the Physical Uplink Shared CHannel (PUSCH). The PUSCH can be shared during the same time period by multiple UEs with each UE using a different part of the operating BandWidth (BW), as illustrated in FIG. 1, in order to avoid mutual interference (Frequency Domain Multiplexing (FDM)). UE1 110 transmits over BW 120 while UE2 130, UE3 150, and UE4 170, transmit over BW 140, BW 160, and BW 180, respectively. An exception is the use of Spatial Division Multiple Access (SDMA) methods, where multiple UEs may share the same RBs over the same sub-frame for their PUSCH data packet transmissions.

The Node B is assumed to transmit data signals (or data packets) to UEs through the Physical Downlink Shared CHannel (PDSCH). Similarly to the PUSCH, the PDSCH can be shared during the same time period by multiple UEs through FDM.

PUSCH and PDSCH transmissions can be scheduled by the Node B through a UL or a DL scheduling assignment, respectively, using the Physical Downlink Control CHannel (PDCCH) or they can be preconfigured to occur periodically (persistent scheduling of PUSCH or PDSCH transmissions). Using the PDCCH, a data signal transmission in the PUSCH or the PDSCH may generally occur at any sub-frame decided by the Node B scheduler. Accordingly, the scheduling of such transmissions is referred to as dynamic.

To avoid excessive PDCCH overhead, some PUSCH and PDSCH transmissions may be configured to occur periodically at predetermined parts of the operating bandwidth. Such scheduling is referred to as persistent. FIG. 2 illustrates the concept of persistent scheduling where an initial packet transmission 210 occurs periodically every assignment interval 220. Persistent scheduling is typically used for communication services having relatively small bandwidth requirements per transmission period but need to be provided for many UEs making dynamic scheduling through the PDCCH inefficient due to the associated overhead introduced in the DL of the communication system. One typical example of such services is Voice over Internet Protocol (VoIP).

In response to the PUSCH and PDSCH transmissions, positive or negative acknowledgement signals, ACK or NAK respectively, are assumed to be transmitted to or from the UEs, respectively. As the invention considers the UL of the communication system, the focus will be on the ACK/NAK signals transmitted by UEs in response to a PDSCH transmission. ACK/NAK signaling is required for use of Hybrid-Automatic Repeat reQuest (HARQ), where a data packet is retransmitted upon the reception of a NAK and a new data packet it transmitted upon the reception of an ACK.

Because the PDSCH scheduling of a UE in the DL can be dynamic or persistent, the transmission of ACK/NAK signals from the UE is correspondingly dynamic or persistent. In the latter case, similarly to the PDSCH transmission, the ACK/NAK transmission from the UE is periodic.

In addition to periodic and dynamic transmission of ACK/NAK signals, other control signals may be periodically transmitted by UEs. One example of such a control signal is the Channel Quality Indication (CQI). The CQI is assumed to be sent periodically to inform the serving Node B of the channel conditions, which can be represented by the Signal-to-Noise and Interference Ratio (SINR) the UE experiences in the DL. Additional periodic transmissions of control signals other than CQI or ACK/NAK may also exist.

Therefore, the UL of the communication system is assumed to support dynamic and persistent PUSCH transmissions, ACK/NAK transmissions due to dynamic and persistent PDSCH transmissions, CQI transmissions, and possibly other control signaling. The transmissions of CQI, persistent PUSCH, and ACK/NAK due to persistent PDSCH are assumed to be periodic until deactivated by the serving Node B or until the corresponding configured transmission period expires. The ACK/NAK and CQI signals will be jointly referred to as the Physical Uplink Control CHannel (PUCCH). Other control signals may also be periodically transmitted in the PUCCH.

The PUSCH transmissions are assumed to occur over a Transmission Time Interval (TTI) corresponding to a sub-frame. FIG. 3 illustrates a block diagram of the sub-frame structure 310 assumed in the exemplary embodiment of the disclosed invention. The sub-frame includes of two slots. Each slot 320 further includes seven symbols and each symbol 330 further includes a Cyclic Prefix (CP) for mitigating interference due to channel propagation effects. The signal transmission in the two slots may or may not be in the same part of the operating bandwidth.

In an exemplary sub-frame structure of FIG. 3, the middle symbol in each slot carries the transmission of Reference Signals (RS) 340, also known as pilot signals, which are used for several purposes including for providing channel estimation to allow coherent demodulation of the received signal. The number of symbols with RS transmission in the UL sub-frame may be different among the PUSCH, the PUCCH with ACK/NAK transmission, and the PUCCH with CQI transmission. For example, the middle three symbols in each slot may be used for RS transmission in case of ACK/NAK PUCCH transmissions (the remaining symbols are used for ACK/NAK transmission) while the second and sixth symbols in each slot may be used for RS transmission in case of CQI PUCCH transmissions (the remaining symbols are used for CQI transmission). This is also illustrated in FIG. 9, FIG. 10, and FIG. 11, which will be described later herein.

The transmission bandwidth is assumed to comprise of frequency resource units, which will be referred to as Resource Blocks (RBs). The exemplary embodiment assumes that each RB includes 12 SC-FDMA sub-carriers and UEs are assumed to be allocated a multiple N of consecutive RBs 350 for PUSCH transmission and 1 RB for PUCCH transmission. Nevertheless, the above values are only illustrative and not restrictive to the invention.

Although not material to the disclosed invention, an exemplary block diagram of the transmitter structure for the PUSCH is illustrated in FIG. 4. If a UE has both data and control (ACK/NAK, CQI, etc.) bits to transmit in the same PUSCH sub-frame, then, in order to transmit the ACK/NAK, certain data bits (such as, for example, the parity bits in the case of turbo coding) may be punctured and replaced by the ACK/NAK bits. Simultaneous PUSCH and PUCCH transmission by a UE is thus avoided and the single-carrier property is preserved. Coded CQI bits 405 (if they exist) and coded data bits 410 are multiplexed 420. If ACK/NAK bits also need to be transmitted in the PUSCH, data bits (or possibly CQI bits) are punctured to accommodate ACK/NAK bits 430. The Discrete Fourier Transform (DFT) of the combined data bits and control bits is then obtained 440, the sub-carriers 450 corresponding to the assigned transmission bandwidth are selected 455, the Inverse Fast Fourier Transform (IFFT) is performed 460 and finally the Cyclic Prefix (CP) 470 and filtering 480 are applied to the transmitted signal 490.

Zero padding is assumed to be inserted by a reference UE in sub-carriers used by another UE and in guard sub-carriers (not shown). Moreover, for brevity, additional transmitter circuitry such as digital-to-analog converter, analog filters, amplifiers, and transmitter antennas as they are known in the art, are not illustrated in FIG. 4. Similarly, the encoding process for the data bits and the CQI bits as well as the modulation process for all transmitted bits are well known in the art and are omitted for brevity.

At the receiver, the inverse (complementary) transmitter functions are performed. This is conceptually illustrated in FIG. 5 where the reverse operations of those in FIG. 4 apply. As it is known in the art (not shown for brevity), an antenna receives the Radio-Frequency (RF) analog signal and after further processing units (such as filters, amplifiers, frequency down-converters, and analog-to-digital converters) the digital received signal 510 passes through a time windowing unit 520 and the CP is removed 530. Subsequently, the receiver unit applies an FFT 540, selects 545 the sub-carriers 550 used by the transmitter, applies an Inverse DFT (IDFT) 560, extracts the ACK/NAK bits and places respective erasures for the data bits 570, and de-multiplexes 580 the CQI bits 590 and data bits 595. As for the transmitter, well known in the art receiver functionalities such as channel estimation, demodulation, and decoding are not shown for brevity and they are not material to the invention.

Also without being material to the disclosed invention, a block diagram of the PUCCH (ACK/NAK, CQI) transmission structure is illustrated in FIG. 6. The transmission is assumed to be through the modulation of Constant Amplitude Zero Autocorrelation (CAZAC)-based sequences 610. Similarly, the RS transmission is assumed to be through non-modulated CAZAC-based sequences 610. The sub-carriers corresponding to the assigned transmission bandwidth are selected 620 and the sequence elements are mapped on the selected PUCCH sub-carriers 630. The Inverse Fast Fourier Transform (IFFT) is performed 640, the output is then cyclically shifted in the time domain 650, and finally the Cyclic Prefix (CP) 660 and filtering 670 are applied to the transmitted signal 680. With respect to the PUSCH transmitter structure in FIG. 4, the main difference is the absence of a DFT block (because, although not required, the CAZAC-based sequence is assumed to be directly mapped in the frequency domain to avoid the DFT operation) and the application of the cyclic shift 650. In addition, Walsh covering may apply to the ACK/NAK, RS, and possibly the CQI signals across the corresponding symbols in the sub-frame (FIG. 3).

The reverse functions are performed for the reception of the CAZAC-based sequence as illustrated in FIG. 7. The received signal 710 passes through a time windowing unit 720 and the CP is removed 730. Subsequently, the cyclic shift is restored 740, an FFT 750 is applied, the sub-carriers 760 used by the transmitter are selected 765, correlation with the replica 770 of the CAZAC-based sequence is applied 780 and the output 790 is obtained. The output can be passed to a channel estimation unit, such as a time-frequency interpolator, in case of an RS, or can be used for detecting the transmitted information, in case the CAZAC-based sequence is modulated by ACK/NAK or CQI information bits.

An example of CAZAC-based sequences is given by the following Equation (1):

$$c_k(n) = \exp\left[\frac{j2\pi k}{L}\left(n + n\frac{n+1}{2}\right)\right]. \quad (1)$$

In Equation (1), L is the length of the CAZAC sequence, n is the index of a particular element of the sequence n={0, 1, 2 ..., L−1}, and finally, k is the index of the sequence itself. For a given length L, there are L−1 distinct sequences, provided that L is prime. Therefore, the entire family of sequences is defined as k ranges in {1, 2 ..., L−1}. However, the CAZAC sequences used for PUCCH signaling need not be generated using the exact above expression as it is further discussed below.

For CAZAC sequences of prime length L, the number of sequences is L−1. As the RBs are assumed to include an even number of sub-carriers, with 1 RB includes 12 sub-carriers, the sequences used to transmit the ACK/NAK and RS can be generated, in the frequency or time domain, by either truncating a longer prime length (such as length 13) CAZAC sequence or by extending a shorter prime length (such as length 11) CAZAC sequence by repeating its first element(s) at the end (cyclic extension), although the resulting sequences do not fulfill the definition of a CAZAC sequence. Alternatively, CAZAC sequences can be generated through a computer search for sequences satisfying the CAZAC properties.

Different cyclic shifts of the same CAZAC sequence provide orthogonal CAZAC sequences. Therefore, different cyclic shifts of the same CAZAC sequence can be allocated to different UEs in the same RB for their RS, ACK/NAK, or CQI transmission and achieve orthogonal UE multiplexing. This principle is illustrated in FIG. 8.

In order for the multiple CAZAC sequences 810, 830, 850, 870 generated correspondingly from multiple cyclic shifts 820, 840, 860, 880 of the same root CAZAC sequence to be orthogonal, the cyclic shift value □ 890 should exceed the channel propagation delay spread D (including a time uncertainty error and filter spillover effects). If Ts is the duration of one symbol, the number of cyclic shifts is equal to the mathematical floor of the ratio Ts/D. The cyclic shift granularity equals an element of the CAZAC sequence. For a CAZAC sequence of length 12, the number of possible cyclic shifts is 12 and for symbol duration of about 66 microseconds (14 symbols in a 1 millisecond sub-frame), the time separation of consecutive cyclic shifts is about 5.5 microseconds.

The CQI transmission parameters, such as the transmission RB and the transmission sub-frame, are configured for each UE through higher layer signaling and remain valid over time periods much longer than a sub-frame. Similarly, the ACK/NAK transmission parameters due to persistent PDSCH scheduling and the persistent PUSCH transmission parameters (such as the RB and sub-frame) also remain the same over comparable time periods.

A consequence of SC-FDMA signaling is that the transmission bandwidth of a signal needs to be contiguous. In order to avoid bandwidth fragmentation for PUSCH transmissions, the PUCCH transmissions need to be placed towards the two ends of the operating bandwidth. Otherwise, if there are RBs available on each side of the PUCCH transmission bandwidth, they cannot be used for PUSCH transmission by the same UE while preserving the single carrier property of the transmission.

Moreover, as PUCCH transmission includes periodic CQI transmissions, periodic ACK/NAK transmissions, and dynamic ACK/NAK transmissions, an appropriate ordering for the corresponding RBs at the two ends of the operating bandwidth needs to be determined.

In addition to PUCCH transmission, persistent scheduling of PUSCH transmissions also results in similar bandwidth occupancy characteristics as the PUCCH.

SUMMARY OF THE INVENTION

Accordingly, the present invention has been designed to solve the above-mentioned problems occurring in the prior art, and an aspect of the present invention is to provide an apparatus and method for allocating frequency resources for the transmission of control signals and data signals from user equipments to their serving Node B.

Additionally, an aspect of the present invention is to determine the partitioning of RBs allocated to PUCCH transmissions among the RBs used for CQI transmissions, periodic ACK/NAK transmissions due to persistent PDSCH scheduling, and dynamic ACK/NAK transmissions due to dynamic PDSCH scheduling.

Additionally, an aspect of the present invention is to maximize the bandwidth utilization for PUSCH transmissions while accommodating the PUCCH transmissions.

Additionally, an aspect of the present invention is to incorporate persistent PUSCH transmissions while avoiding bandwidth fragmentation.

Additionally, an aspect of the present invention is to facilitate the achievement of the reception reliability requirements, particularly for control signals.

Additionally, an aspect of the present invention is to inform the UEs of the first RB that is available for dynamic ACK/NAK transmissions.

In accordance with an aspect the present invention, a method is provided for determining a resource for an acknowledgement signal by a user equipment (UE) in a wireless communication system. A transceiver of the UE receives a parameter associated with one or more RBs for periodic transmission of a CQI signal in an operating bandwidth. A controller of the UE determines an RB for transmission of the acknowledgement signal, based on the parameter. The transceiver transmits the acknowledgement signal on the determined RB. The RB for the transmission of the acknowledgement signal is not more outer than the one or more RBs for periodic transmission of the CQI signal in the operating bandwidth.

In accordance with another aspect of the present invention, UE in a wireless communication system is provided. The UE includes a transceiver configured to transmit and receive a signal over a network. The UE also includes a controller configured to control receiving a parameter associated with one or more RBs for periodic transmission of a CQI signal in an operating bandwidth, determining an RB for transmission of an acknowledgement signal, based on the parameter, and transmitting the acknowledgement signal on the determined RB. The RB for the transmission of the acknowledgement signal is not more outer than the one or more RBs for periodic transmission of the CQI signal in the operating bandwidth.

In accordance with another aspect of the present invention, a method is provided for determining a resource for an acknowledgement signal by a base station in a wireless communication system. A transceiver of the base station transmits a parameter associated with one or more RBs for periodic transmission of a CQI signal in an operating bandwidth. A controller of the base station receives the acknowledgement signal on an RB determined based on the parameter. The RB for reception of the acknowledgement signal is not more outer than the one or more RBs for periodic transmission of the CQI signal in the operating bandwidth.

In accordance with another aspect of the present invention, a base station in a wireless communication system is provided. The base station includes a transceiver configured to transmit and receive a signal over a network. The base station also includes a controller configured to control transmitting a parameter associated with one or more RBs for periodic transmission of a CQI signal in an operating bandwidth, and receiving the acknowledgement signal on an RB determined based on the parameter. The RB for reception of the acknowledgement signal is not more outer than the one or more RBs for periodic transmission of the CQI signal in the operating bandwidth.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS

The present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention assumes a Single-Carrier Frequency Division Multiple Access (SC-FDMA) communication system, it also applies to all FDM systems in general and to OFDMA, OFDM, FDMA, DFT-spread OFDM, DFT-spread OFDMA, Single-Carrier OFDMA (SC-OFDMA), and single-carrier OFDM in particular.

System and methods of the embodiments of the invention solve problems related to the need for maximizing the utilization of the available bandwidth for the transmission of signals from user equipments to a serving Node B, for facilitating the achievement of desired transmission reliability targets, and for informing the UEs with transmission of acknowledgement signals of the first frequency unit (or resource block (RB)) available for the transmission of these signals.

As discussed in the foregoing background, several signals in the UL have a periodic nature and the corresponding allocation of resource blocks (RBs), or frequency units, per sub-frame can be predetermined over relatively long time periods compared to the sub-frame duration. These signals include the CQI, the ACK/NAK associated with persistent PDSCH transmissions, and the persistent PUSCH. As it will be subsequently explained in detail, for several reasons, including avoiding bandwidth fragmentation while supporting single carrier transmission, it is desirable to place these signals towards the two edges (ends) of the operating bandwidth.

In addition to dynamically scheduled PUSCH transmissions, other signals that may require a variable number of RBs per sub-frame include the ACK/NAK for dynamic PDSCH transmissions (dynamic ACK/NAK). The RBs for dynamic ACK/NAK transmissions should therefore be placed next to the ones for dynamic PUSCH transmissions, start after the last RB allocated to periodic PUCCH and PUSCH transmissions, and be placed towards the interior of the operating BandWidth (BW).

Figure 1:
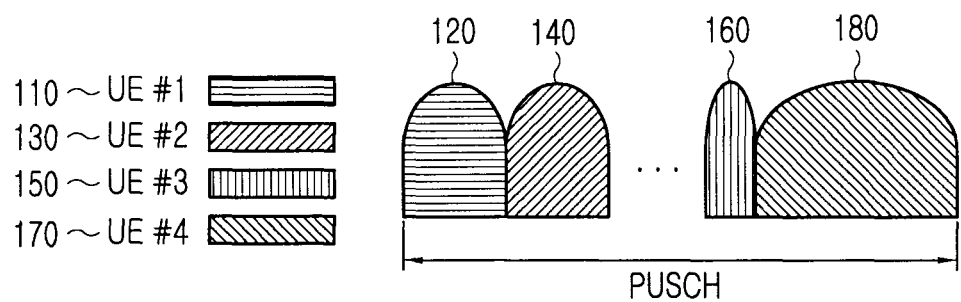
FIG. 1 is a diagram illustrating a partitioning of an operating bandwidth for an orthogonal transmission of signals from multiple UEs through frequency division multiplexing.
Figure 2:
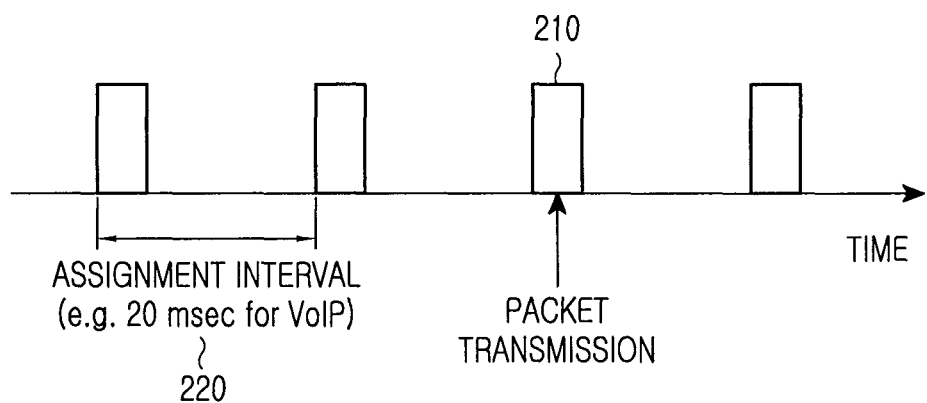
FIG. 2 is a diagram illustrating the concept of persistent (periodic) data signal transmission from a UE.
Figure 3:
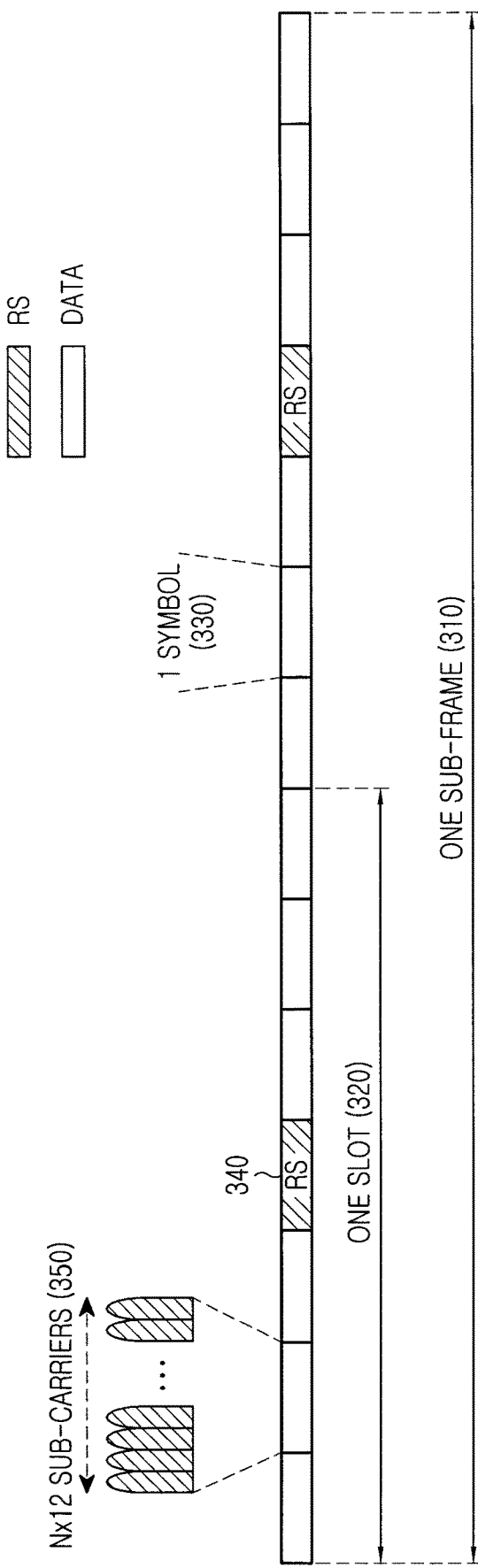
FIG. 3 is a block diagram illustrating an exemplary sub-frame structure for the SC-FDMA communication system.
Figure 4:
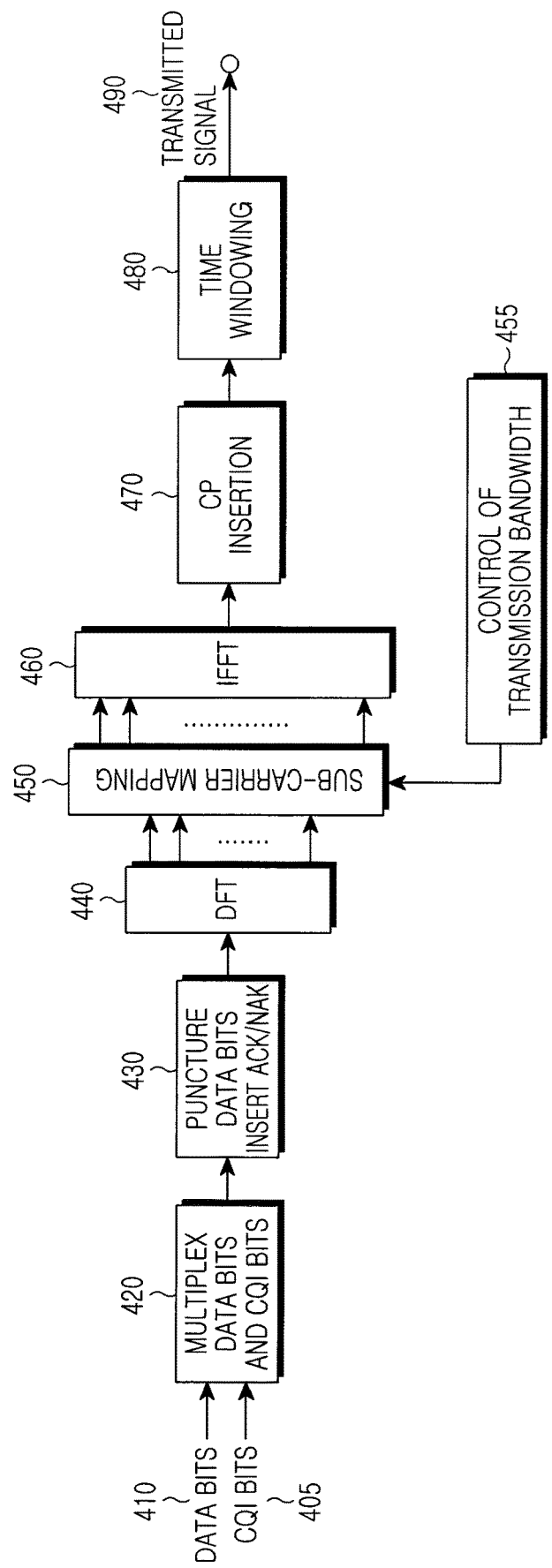
FIG. 4 is a block diagram illustrative of a first exemplary SC-FDMA transmitter for multiplexing data bits, CQI bits, and ACK/NAK bits in a transmission sub-frame.
Figure 5:
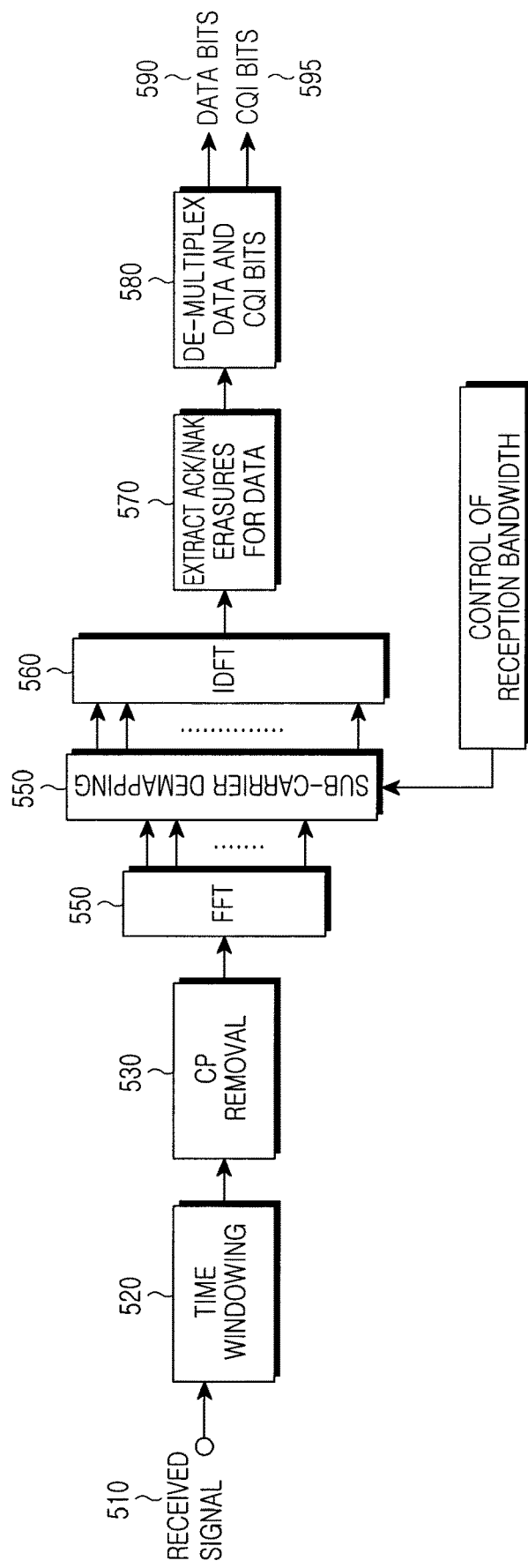
FIG. 5 is a block diagram illustrative of an exemplary SC-FDMA receiver for de-multiplexing data bits, CQI bits, and ACK/NAK bits in a reception sub-frame.
Figure 6:
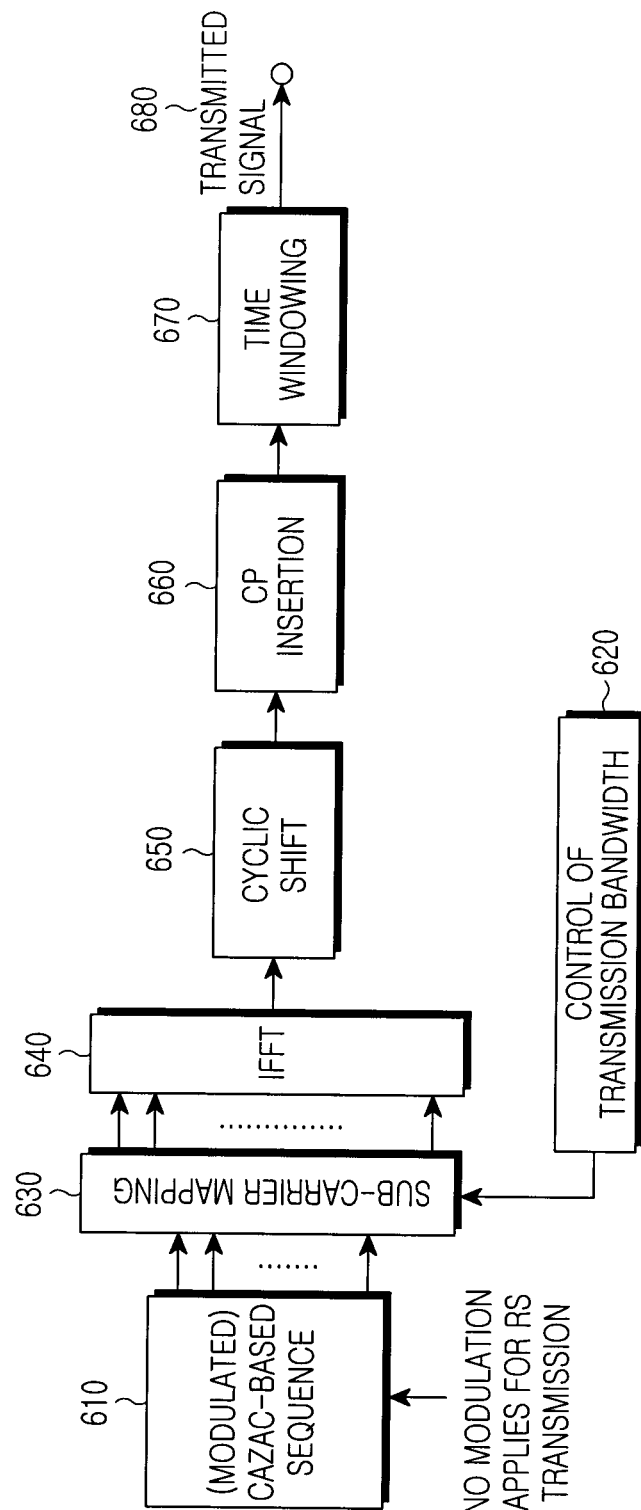
FIG. 6 is a block diagram illustrating an exemplary transmitter for a CAZAC-based sequence in a frequency domain.
Figure 7:
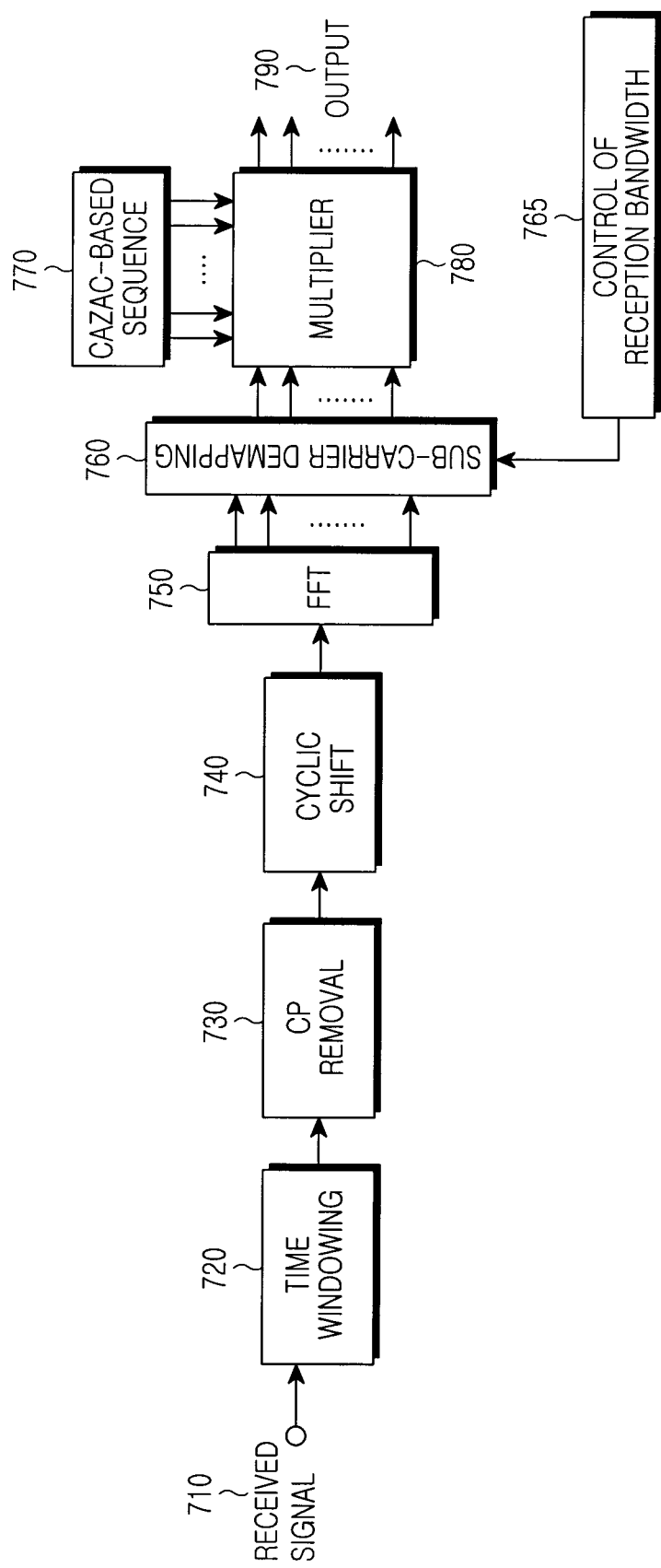
FIG. 7 is a block diagram illustrating an exemplary receiver for a CAZAC-based sequence in a frequency domain.
Figure 8:
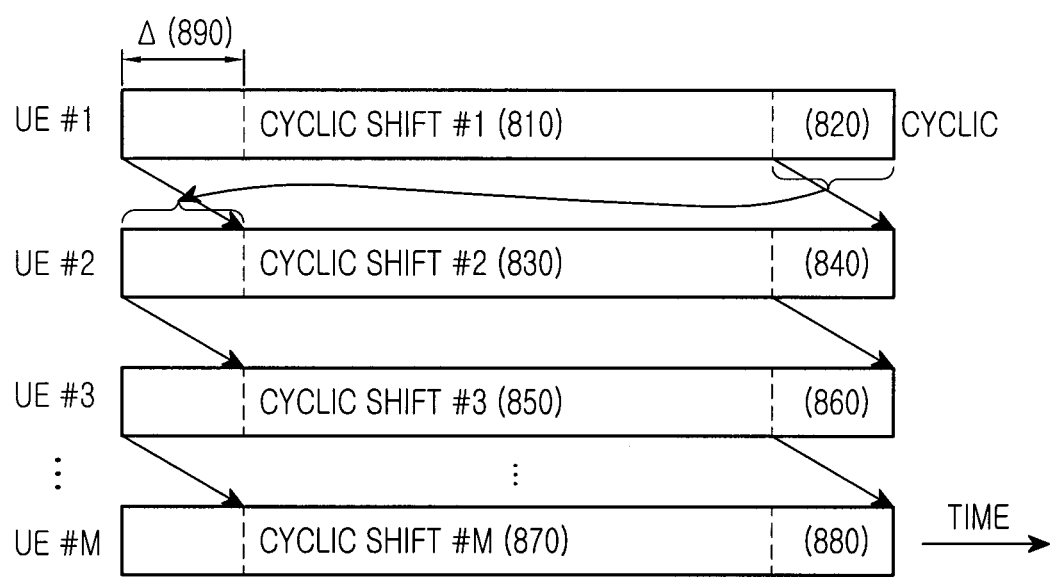
FIG. 8 is a block diagram illustrating an exemplary construction of orthogonal CAZAC-based sequences through the application of different cyclic shifts on a root CAZAC-based sequence.
Figure 9:
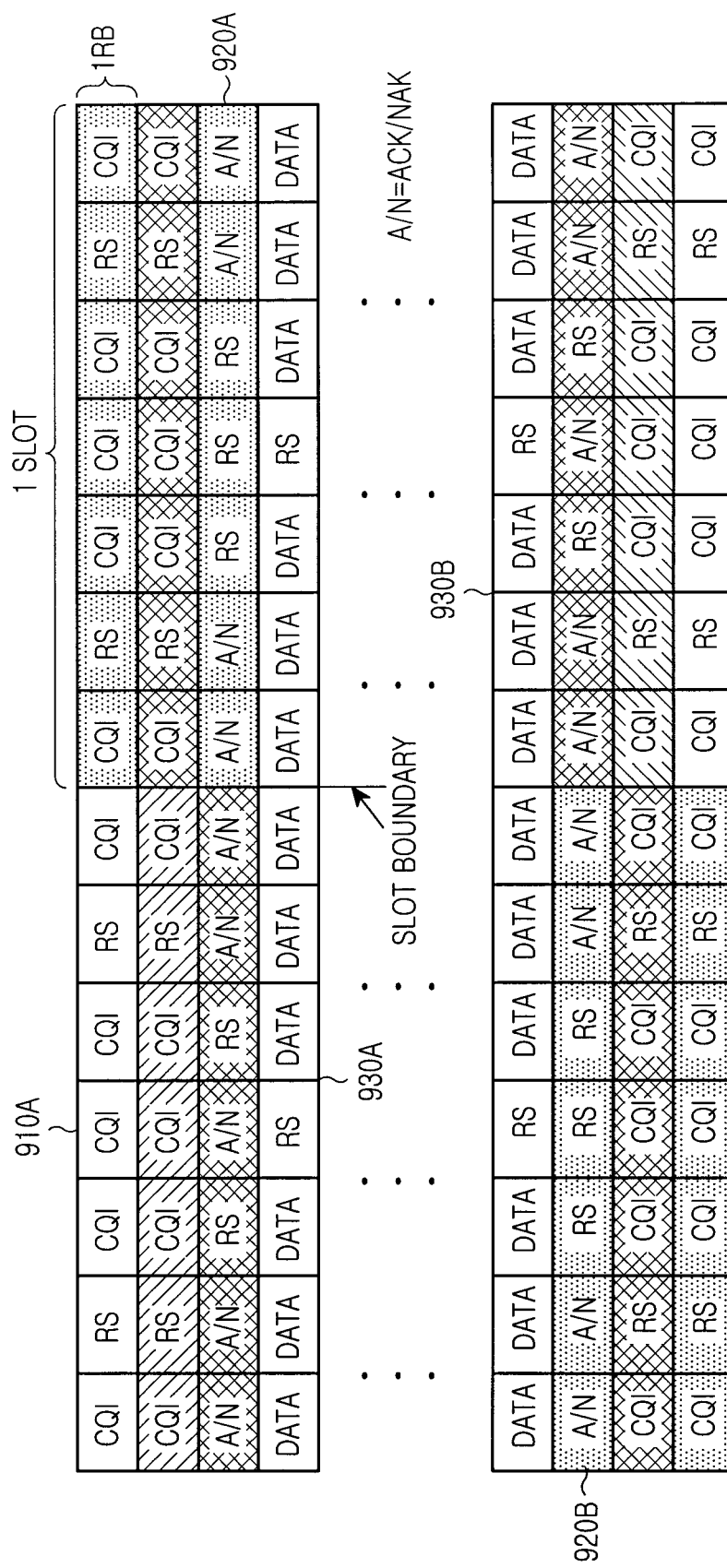
FIG. 9 is a diagram illustrating an exemplary partitioning of resource blocks for CQI, ACK/NAK, and data signal transmissions.

The partitioning of periodic PUCCH transmissions, such as the CQI signaling, and dynamic PUCCH ACK/NAK transmissions is first considered in the exemplary setup illustrated in FIG. 9. The CQI transmission from a UE is assumed to take place at the opposite ends of the operating BW in the first slot 910A and the second slot 910B. According to the invention, the RBs used for dynamic ACK/NAK transmission from another, different, UE in the first slot 920A and the second slot 920B are placed to the interior of the ones used for the CQI transmission and are adjacent to and to the exterior of the RBs used for dynamic PUSCH transmission in the first slot 930A and second slot 930B of the sub-frame.

As the number of UEs having dynamic PDSCH transmissions in a sub-frame may vary, the number of RBs used by the corresponding dynamic ACK/NAK transmissions in the PUCCH may also vary per sub-frame (although only one RB is illustrated in FIG. 9 for dynamic ACK/NAK transmissions). Such variations cannot be expected in advance as the Node B scheduler is assumed to operate without constraints on the number of assigned dynamic PDSCH transmissions per sub-frame.

As each UE with dynamic ACK/NAK transmission is assumed to know the multiplexing capacity in one RB (this parameter can be broadcasted by the serving Node B) and its relative position with respect to ACK/NAK transmissions from other UEs (either through explicit signaling by the serving Node B or implicitly, such as for example through the index of the PDCCH used for the scheduling assignment), it can know which RB and which resource within the RB (such as which cyclic shift of a CAZAC-based sequence) to use. For example, if the ACK/NAK multiplexing capacity is 18 and the relative order of a UE for ACK/NAK transmission is 20, that UE uses for its ACK/NAK transmission the second resource in the second RB used for dynamic ACK/NAK transmissions. In general, if the ACK/NAK multiplexing capacity in an RB is M and the relative order of a UE with dynamic ACK/NAK transmission is P, the UE may use the resource:

$$\mathrm{mod}(P, M),$$

within the RB number of $$Q = \mathrm{ceil}(P/M),$$

where mod(x, y) is x minus (n times y) where n equals to floor(x divided by y). The "floor" operation rounds a number to its immediately smaller integer while the "ceil" operation rounds a number to its immediately larger integer.

Placing the RBs for dynamic ACK/NAK transmissions towards the interior of the operating bandwidth after the ones used for periodic PUCCH transmissions (such as the CQI ones) for which the number of RBs per sub-frame are fixed over long time periods, and adjacent and to the exterior of the RBs used for dynamic PUSCH transmissions, avoids bandwidth fragmentation or bandwidth waste due to unused RBs. Otherwise, if the RBs for dynamic ACK/NAK transmissions were placed before the ones for periodic PUCCH transmissions and towards the exterior of the operating bandwidth, bandwidth fragmentation would occur when the number of RBs for dynamic ACK/NAK transmissions varied between sub-frames.

Instead, with the RB partitioning between periodic and dynamic PUCCH transmissions as illustrated in FIG. 9, any variation in the number of RBs used for dynamic ACK/NAK transmissions can be seamlessly absorbed in the scheduling of dynamic PUSCH transmissions in the remaining RBs without resulting to any wasted RBs or causing bandwidth fragmentation as the former RBs can simply be viewed as an extension of the latter and the reverse. The serving Node B knows how many RBs will be required in every sub-frame for dynamic ACK/NAK transmissions and can therefore accordingly allocate the RBs for PUSCH transmissions without incurring bandwidth fragmentation.

Another reason for having the RBs for the dynamic ACK/NAK transmissions in the interior of the ones allocated to periodic PUCCH transmissions is that the former RBs can become available for PUSCH transmission after a certain number of UL sub-frames. This happens when the DL sub-frames carry multicast-broadcast traffic because there is no ACK/NAK transmission in corresponding subsequent UL sub-frames (no unicast PDSCH transmissions requiring ACK/NAK feedback are assumed to occur during multicast-broadcast DL sub-frames). This may not be possible, due to the single carrier property, if the RBs for ACK/NAK transmission are not adjacent to the ones for PUSCH transmission.

Yet another reason for having the dynamic ACK/NAK RBs in the interior part of the operating bandwidth used for dynamic ACK/NAK and periodic PUCCH transmissions is that the former typically need to be more reliable than the latter. Transmissions in interior RBs largely avoid out-of-band interference created by transmissions in adjacent bandwidths, which may be at a substantially larger power, and therefore ACK/NAK signals are better protected against such interference if they are placed in interior RBs.

Figure 10:
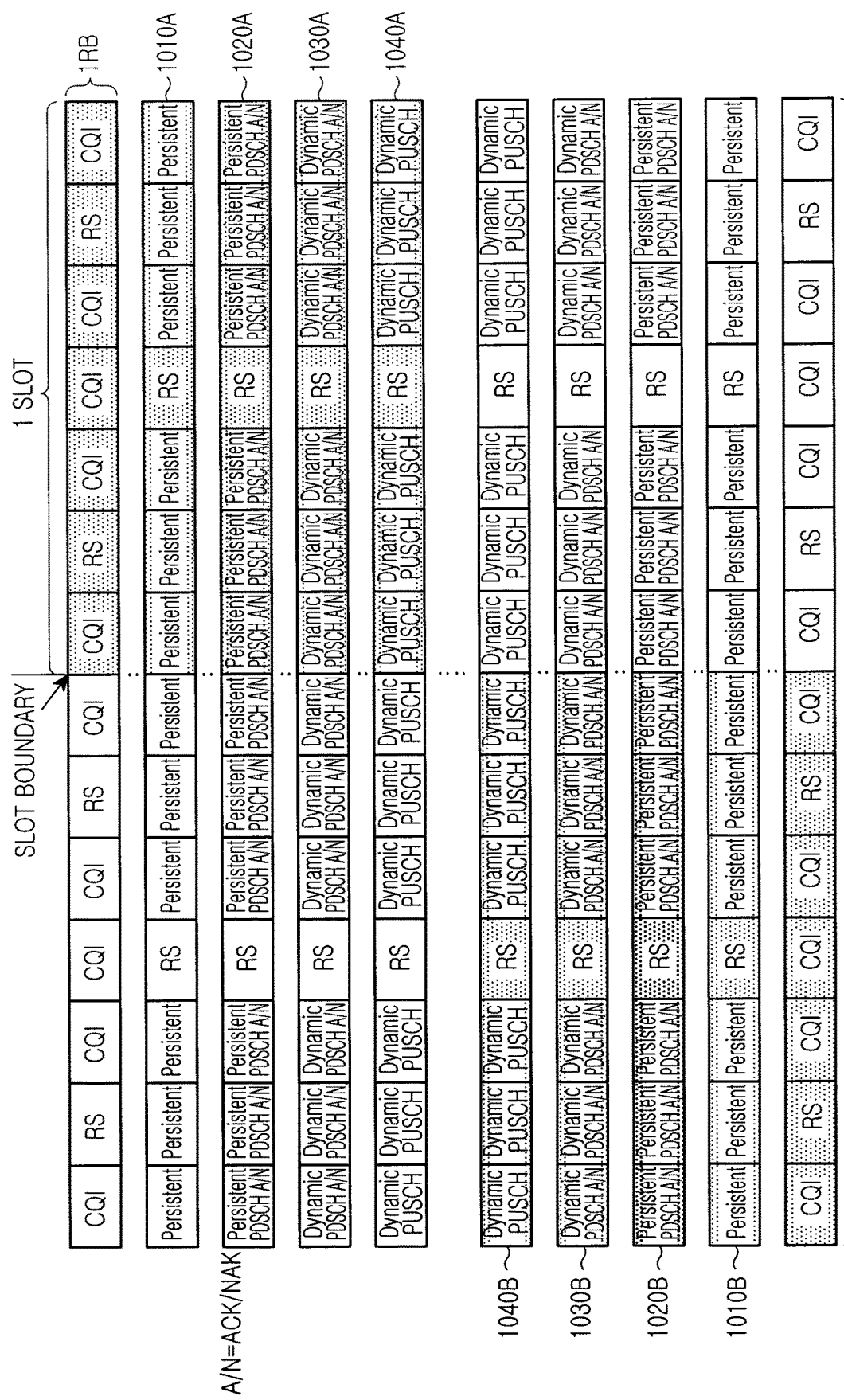
FIG. 10 is a diagram illustrating a first exemplary partitioning of resource blocks for CQI, persistent and dynamic ACK/NAK, and persistent and dynamic data signal transmissions.

A generalization of the RB allocation of FIG. 9 is presented in FIG. 10 where in addition to the RBs for CQI, dynamic ACK/NAK, and dynamic PUSCH transmissions, the RBs for persistent ACK/NAK and persistent PUSCH transmissions are also included. The order of the periodic transmissions can be interchanged or mixed. Such an alternative order for the periodic transmissions is illustrated in FIG. 11.

The RBs for persistent ACK/NAK transmissions 1010A and 1010B or the RBs for persistent PUSCH transmissions 1020A and 1020B are located to the exterior of RBs for dynamic ACK/NAK transmissions 1030A and 1030B which are again placed adjacent and to the exterior of the RBs for dynamic PUSCH transmissions 1040A and 1040B because they are the only ones that may vary between sub-frames in a way that cannot be predetermined. While the RBs for the periodic PUCCH and persistent PUSCH transmissions may also vary between sub-frames, this happens in a predetermined manner.

Moreover, although in FIG. 10 the RBs for ACK/NAK transmission due to persistent PDSCH scheduling are located in both slots to the interior of the RBs for CQI transmission, this is not necessary and the latter can be located to the interior of the former in one of the two slots. Additionally, the transmission for any of these signals may be confined in only one slot or extend past one sub-frame.

Figure 11:
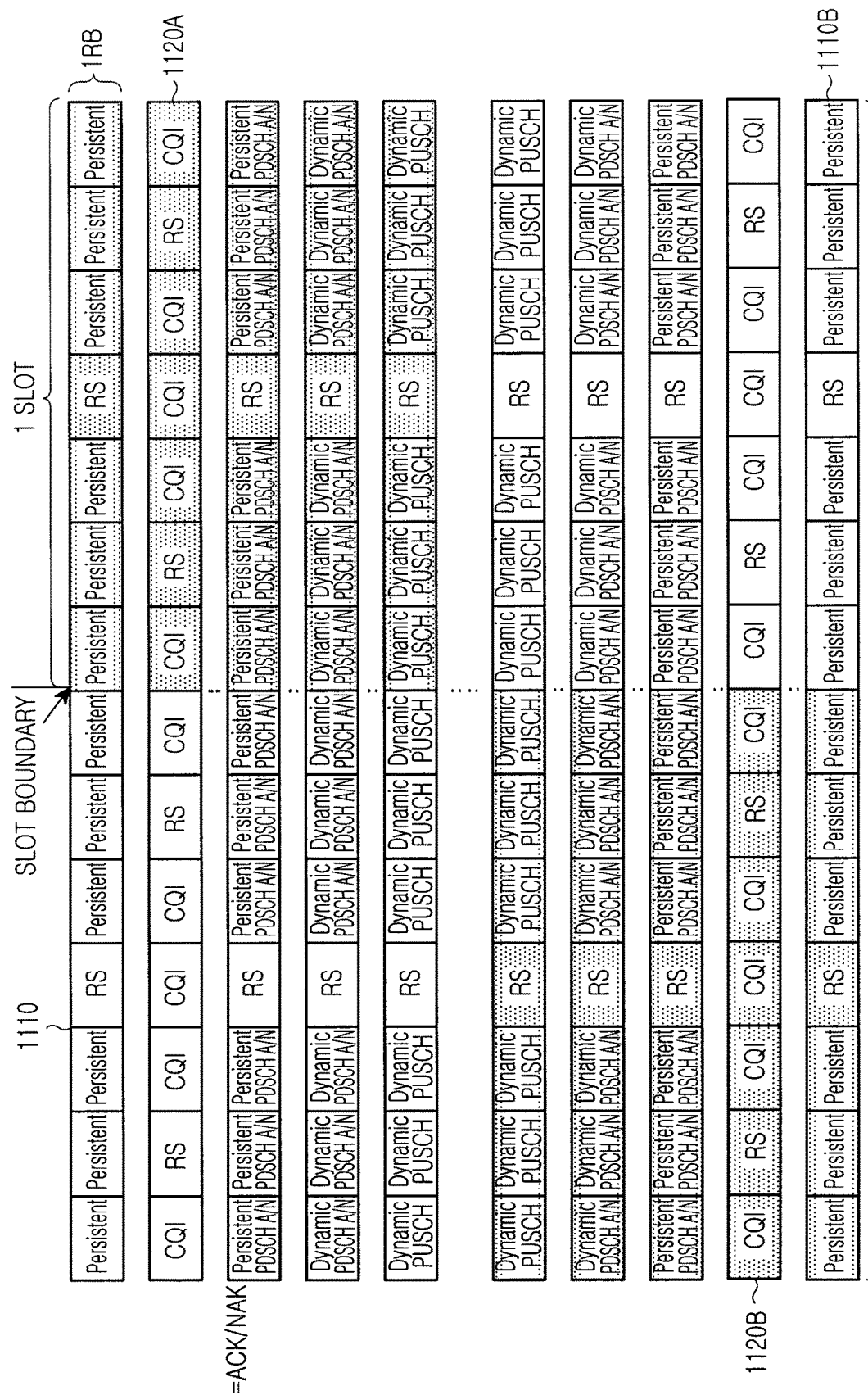
FIG. 11 is a diagram illustrating a second exemplary partitioning of resource blocks for CQI, persistent and dynamic ACK/NAK, and persistent and dynamic data signal transmissions.

FIG. 11 illustrates the same principle as FIG. 10 with the only difference being the relative placement of persistent PUSCH 1110A and 1110B and CQI transmissions 1120A and 1120B. As CQI transmissions typically require better reception reliability than persistent PUSCH transmissions as the latter benefit from the use of HARQ, avoiding the CQI placement in RBs at the edge of the operating bandwidth protects the CQI signal from potential out-of-band interference and can therefore improve its reception reliability.

In both FIG. 10 and FIG. 11, the RBs for persistent ACK/NAK transmissions are located to the exterior of the RBs for dynamic ACK/NAK transmissions and to the interior of the RBs for CQI transmissions or persistent PUSCH transmissions. In this manner, if there is no PDSCH scheduling in a previous DL sub-frame, such as when that sub-frame conveys multicast-broadcast communication traffic, no ACK/NAK transmission occurs in a corresponding subsequent UL sub-frame and the RBs that would otherwise be used for ACK/NAK transmissions by UEs can be used for PUSCH transmissions.

Having a fixed number of RBs per sub-frame for all periodic transmissions (CQI, ACK/NAK due to persistent PDSCH scheduling, persistent PUSCH scheduling), and placing the ACK/NAK RBs due to dynamic PDSCH scheduling between the ones for periodic transmissions and the ones for dynamic PUSCH transmissions, the RBs available for dynamic PUSCH transmissions are contiguous and well defined. This fixed number of RBs per sub-frame for the periodic transmissions can be communicated to the UEs through a broadcast channel. This information is used as an index by the UEs to determine the RBs for dynamic ACK/NAK transmissions (first RB) if these RBs do not start from the edges of the operating bandwidth. Knowing the fixed number of RBs per sub-frame used for periodic transmissions, a UE can apply an offset equal to the number of these RBs (equal to the index) in order to determine the first available RB for ACK/NAK transmission due to dynamic PDSCH scheduling.

Using FIG. 10 as an example, the serving Node B broadcasts the total number of RBs used for all periodic transmissions (such as CQI, persistent PUSCH scheduling, ACK/NAK due to persistent PDSCH scheduling) and this value serves as an index for a UE to determine the first RB available for ACK/NAK transmission due to dynamic PDSCH scheduling by applying a respective offset, equal to that index, relative to the first RB at either end of the operating bandwidth.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for determining a resource for an acknowledgement signal by a user equipment (UE) in a wireless communication system, the method comprising:
receiving, by a transceiver of the UE, a parameter associated with one or more resource blocks (RBs) for periodic transmission of a channel quality indication (COI) signal in an operating bandwidth;
determining, by a controller of the UE, an RB for transmission of the acknowledgement signal, based on the parameter; and
transmitting, by the transceiver, the acknowledgement signal on the determined RB,
wherein the RB for the transmission of the acknowledgement signal is not closer to an end of the operating bandwidth than the one or more RBs for periodic transmission of the CQI signal, and
wherein the parameter is used as an offset value for determining the RB in the operating bandwidth.

2. The method of claim 1, wherein:
the RB is determined based on a first RB corresponding to the parameter, and
the first RB is for transmission of an acknowledgement signal in the operating bandwidth.

3. The method of claim 1, wherein the RB for the transmission of the acknowledgement signal is more interior in the operating bandwidth than the one or more RBs for periodic transmission of the CQI signal.

4. The method of claim 1, further comprising transmitting an uplink data signal in response to a scheduling assignment transmitted from the base station to the UE.

5. A user equipment (UE) in a wireless communication system, the UE comprising:
a transceiver configured to transmit and receive a signal over a network;
a controller configured to control receiving a parameter associated with one or more resource blocks (RBs) for periodic transmission of a channel quality indication (COI) signal in an operating bandwidth, determining an RB for transmission of an acknowledgement signal, based on the parameter, and transmitting the acknowledgement signal on the determined RB,
wherein the RB for the transmission of the acknowledgement signal is not closer to an end of the operating bandwidth than the one or more RBs for periodic transmission of the CQI signal, and
wherein the parameter is used as an offset value for determining the RB in the operating bandwidth.

6. The UE of claim 5, wherein:
the RB is determined based on a first RB corresponding to the parameter, and
the first RB is for transmission of an acknowledgement signal in the operating bandwidth.

7. The UE of claim 5, wherein the RB for the transmission of the acknowledgement signal is more interior in the operating bandwidth than the one or more RBs for periodic transmission of the CQI signal.

8. The UE of claim 5, wherein the controller is further configured to control transmitting an uplink data signal in response to a scheduling assignment transmitted from the base station to the UE.

9. A method for determining a resource for an acknowledgement signal by a base station in a wireless communication system, the method comprising:
transmitting, by a transceiver of the base station, a parameter associated with one or more resource blocks (RBs) for periodic transmission of a channel quality indication (CQI) signal in an operating bandwidth; and
receiving, by a controller of the base station, the acknowledgement signal on an RB determined based on the parameter,
wherein the RB for reception of the acknowledgement signal is not closer to an end of the operating bandwidth than the one or more RBs for periodic transmission of the CQI signal, and
wherein the parameter is used as an offset value for determining the RB in the operating bandwidth.

10. The method as claimed in claim 9, wherein:
the RB is determined based on a first RB corresponding to the parameter, and
the first RB is for transmission of an acknowledgement signal in the operating bandwidth.

11. The method as claimed in claim 9, wherein the RB for the reception of the acknowledgement signal is more interior in the operating bandwidth than the one or more RBs for periodic transmission of the CQI signal.

12. The method of claim 9, further comprising receiving an uplink data signal in response to a scheduling assignment transmitted from the base station to the UE.

13. A base station in a wireless communication system, the base station comprising:
a transceiver configured to transmit and receive a signal over a network; and
a controller configured to control transmitting a parameter associated with one or more resource blocks (RBs) for periodic transmission of a channel quality indication (CQI) signal in an operating bandwidth, and receiving the acknowledgement signal on an RB determined based on the parameter,
wherein the RB for reception of the acknowledgement signal is not closer to an end of the operating bandwidth than the one or more RBs for periodic transmission of the CQI signal, and
wherein the parameter is used as an offset value of the determining the RB in the operating bandwidth.

14. The base station of claim 13, wherein:
the RB is determined based on a first RB corresponding to the parameter, and
the first RB is for transmission of an acknowledgement signal in the operating bandwidth.

15. The base station of claim 13, wherein the RB for the reception of the acknowledgement signal is more interior in the operating bandwidth than the one or more RBs for periodic transmission of the CQI signal.

16. The base station of claim 13, wherein the controller is further configured to control receiving an uplink data signal in response to a scheduling assignment transmitted from the base station to the UE.

* * * * *

UNITED STATES PATENT AND TRADEMARK OFFICE
CERTIFICATE OF CORRECTION

| | | |
|---|---|---|
| PATENT NO. | : 11,523,391 B2 | Page 1 of 1 |
| APPLICATION NO. | : 16/907880 | |
| DATED | : December 6, 2022 | |
| INVENTOR(S) | : Aris Papasakellariou et al. | |

It is certified that error appears in the above-identified patent and that said Letters Patent is hereby corrected as shown below:

In the Claims

In Column 11, Line 23, in Claim 1:
"(COI) signal in an operating bandwidth;"
Should be:
-- "(CQI) signal in an operating bandwidth; --

In Column 11, Line 54, in Claim 5:
"(COI) signal in an operating bandwidth, determining an"
Should be:
-- (CQI) signal in an operating bandwidth, determining an --

Signed and Sealed this
Twenty-second Day of April, 2025

Coke Morgan Stewart
*Acting Director of the United States Patent and Trademark Office*